US007609246B2

(12) United States Patent

Hsu et al.

(10) Patent No.: US 7,609,246 B2
(45) Date of Patent: *Oct. 27, 2009

(54) LIQUID CRYSTAL DISPLAY AND REPAIR LINES STRUCTURE THEREOF

(75) Inventors: Sheng-Kai Hsu, Changhua (TW); Po-Yuan Liu, Hsinchu (TW)

(73) Assignee: AU Optronics Corp., Hsin-Chu (TW)

( * ) Notice: Subject to any disclaimer, the term of this patent is extended or adjusted under 35 U.S.C. 154(b) by 571 days.

This patent is subject to a terminal disclaimer.

(21) Appl. No.: 11/445,139

(22) Filed: Jun. 2, 2006

(65) Prior Publication Data

US 2007/0109235 A1 May 17, 2007

(30) Foreign Application Priority Data

Nov. 14, 2005 (TW) .............................. 94139947 A

(51) Int. Cl.
*G09G 3/36* (2006.01)
*G02F 1/1333* (2006.01)

(52) U.S. Cl. .......................................... 345/93; 349/54

(58) Field of Classification Search .................... 345/87
See application file for complete search history.

(56) References Cited

U.S. PATENT DOCUMENTS 5,298,891 A * 3/1994 Plus et al. ..................... 345/93
5,473,452 A * 12/1995 Shin ............................ 349/54
5,969,779 A * 10/1999 Kim et al. ..................... 349/54
6,111,558 A * 8/2000 Jeung et al. ................... 345/93
6,111,621 A * 8/2000 Kim et al. ..................... 349/54
6,525,705 B1 * 2/2003 Ishii et al. ..................... 345/87
6,639,634 B1 * 10/2003 Zhang et al. .................. 349/54
6,680,770 B1 * 1/2004 Nagase ....................... 349/139
7,525,529 B2 * 4/2009 Huang et al. .................. 345/93
2004/0075800 A1 * 4/2004 Sah et al. .................... 349/149
2005/0110738 A1 * 5/2005 Kim et al. ................... 345/100
2005/0174316 A1 8/2005 Kang
2006/0125754 A1 * 6/2006 Rao et al. ..................... 345/93
2008/0172570 A1 * 7/2008 Hsu et al. ....................... 714/3
2009/0122215 A1 * 5/2009 Hsu et al. ..................... 349/54

FOREIGN PATENT DOCUMENTS

CN 1687982 A 10/2005

* cited by examiner

*Primary Examiner*—Richard Hjerpe
*Assistant Examiner*—Dorothy Webb
(74) *Attorney, Agent, or Firm*—Bacon & Thomas, PLLC

(57) ABSTRACT

A liquid crystal display and a repair lines structure thereof are provided. In the liquid crystal display, an amplifier is disposed inside an integrated circuit chip, such as a data driver or a scan driver. The amplifier is serially connected to the signal line via a repair line by means of an appropriate connection circuit. Consequently, the problem of signal attenuation occurring in the repair line will be improved.

19 Claims, 9 Drawing Sheets

LIQUID CRYSTAL DISPLAY AND REPAIR LINES STRUCTURE THEREOF

This application claims the benefit of Taiwan application Serial No. 94139947, filed Nov. 14, 2005, the subject matter of which is incorporated herein by reference.

BACKGROUND OF THE INVENTION

1. Field of the Invention

The invention relates in general to a liquid crystal display, and more particularly, to a liquid crystal display with a repair line structure having amplifier being disposed inside the integrated circuit chip.

2. Description of the Related Art

The liquid display panel has a lower glass substrate. The lower glass substrate has a number of pixel circuits, a number of scan lines and a number of data lines formed thereon. The scan lines are perpendicular to and crossed with the data lines, and are respectively and electrically connected to corresponding pixels to form a pixel array on the substrate. Each pixel receives a corresponding control signal (the scan signal and the pixel voltage) via a corresponding scan line and a corresponding data line to display an image.

Besides, the lower glass substrate has several repair lines disposed thereon. The repair lines are also called rescue lines. The repair lines partly formed on the lower glass substrate and crossed over the scan lines or the data lines are used as substitute circuit when open circuit occurs in the above scan lines or the data lines. That is, the control signal (the scan signal or the pixel voltage) is transmitted to the corresponding pixel via the repair line. However, when the development of the liquid crystal display panel is headed towards large-scale products, such as large-scale liquid crystal TV, the routing path length of the repair line will increase accordingly. In terms of large-scale liquid crystal display panels, how to improve signal attenuation transmitted in the repair line and maintain the manufacturing cost of the liquid crystal display have become an imminent challenge to be resolved in the panel industry.

SUMMARY OF THE INVENTION

It is therefore an object of the present invention to provide a liquid crystal display and a repair line structure thereof. An amplifier is disposed inside the integrated circuit chip. The amplifier is electrically connected to the repair line via an appropriate connection circuit. Consequently, the problem of signal attenuation occurring in the repair line is solved, the repair flexibility is increased, and the manufacturing cost is effectively controlled.

The present invention achieves the above-identified object by providing a liquid crystal display. The liquid crystal display includes a display panel, an internal repair line, a repair line and an integrated circuit chip. The display panel has several signal lines. The internal repair line is formed on the display panel and crossed over the plurality of signal lines. At least part of the repair line is formed on the display panel and part of the repair line crossed over the plurality of signal lines. The integrated circuit chip is electrically connected to the signal lines. The integrated circuit chip includes a first amplifier having an input end selectively electrically connected to the at least one internal repair line, and an output end selectively electrically connected to the at least one repair line.

Other objects, features, and advantages of the present invention will become apparent from the following detailed description of the preferred but non-limiting embodiments. The following description is made with reference to the accompanying drawings.

DETAILED DESCRIPTION OF THE INVENTION

According to the present invention, an amplifier is disposed inside an integrated circuit chip, such as a data driver or a scan driver, and an appropriate connection circuit is designed for enabling the amplifier to be electrically connected to a repair line, thereby solving the problem of signal attenuation occurring in the repair line. Despite the amplifier is disposed in the integrated circuit chip, the manufacturing cost of the integrated circuit chip will not increase as long as the size of the integrated circuit chip is not increased. Therefore, the design of appropriately disposing the amplifier inside the integrated circuit chip not only solves the problem of signal attenuation, but also effectively reduces the manufacturing cost of the liquid crystal display. Besides, the design of having an appropriate connection circuit further increases the flexibility of repairing the signal line, that is, the flexibility of repairing the data line and the scan line.

Apart from that, when the output ends of several amplifiers are all electrically connected to the same repair line, the invention can further dispose a switch circuit between each output end of the amplifiers and the repair line, so that the output ends of the amplifiers are selectively connected to the repair line by the switch circuit. Thus, the invention not only reduces the cost of laser weld, but also resolves the interference among several amplifiers.

Figure 1:
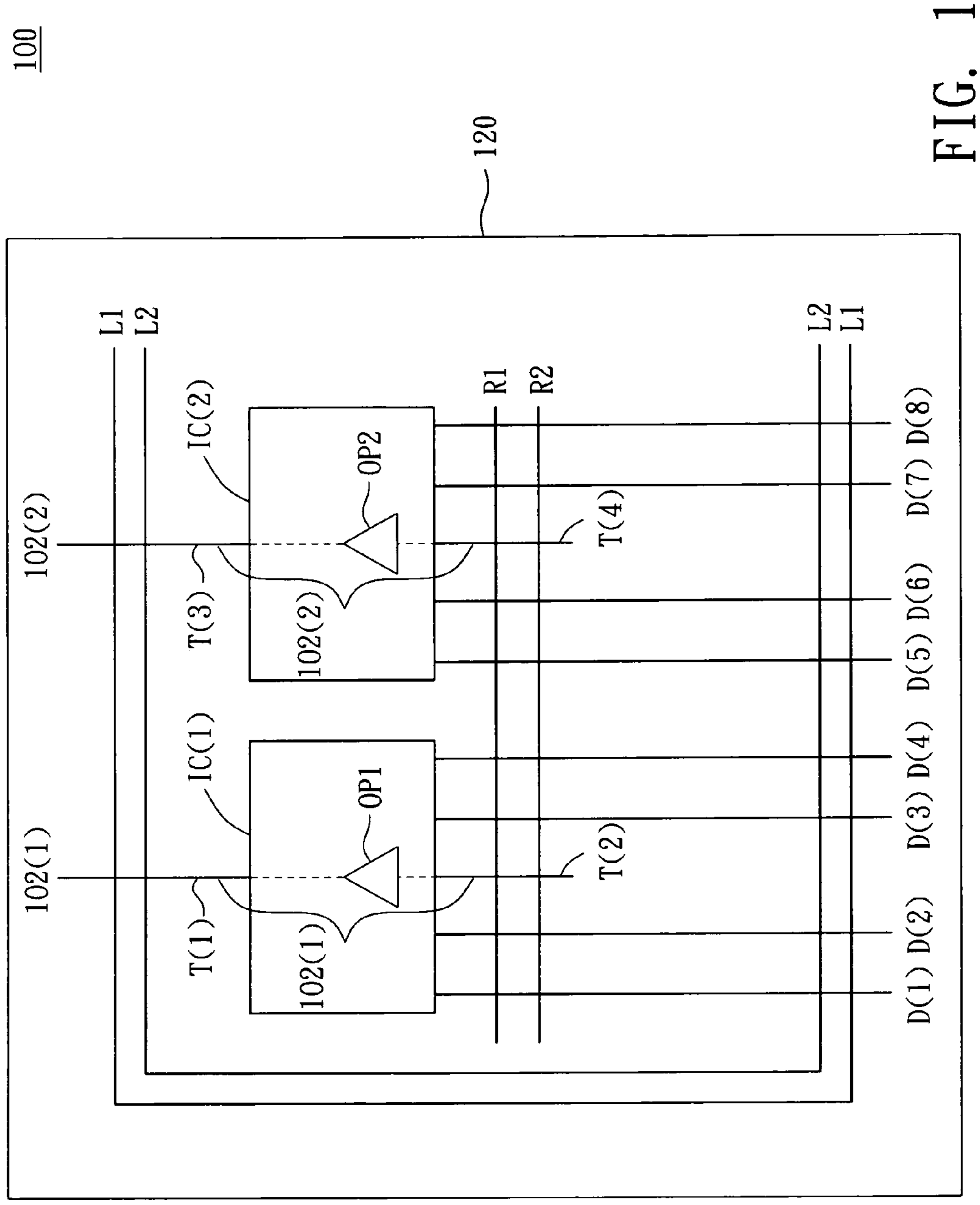
FIG. 1 is a structural diagram of a liquid crystal display.

Referring to FIG. 1, a structural diagram of a liquid crystal display is shown. The liquid crystal display 100 includes several integrated circuit chips IC, several internal repair lines R, several repair lines L, a number of signal lines D, several connection circuits 102 and a display panel 120. FIG. 1 illustrates two integrated circuit chips IC (1) and IC (2), two internal repair lines R1 and R2, two repair lines L1 and L2, eight signal lines D(1)~D(8) and two connection circuits 102(1) and 102(2). Examples of the integrated circuit chips IC (1) and IC (2) include data drivers or scan drivers. In FIG. 1, the data driver is exemplified and is disposed on the display panel 120 according to the chip on glass (COG) technology. The signal lines D(1)~D(8) are formed on the display panel 120, and the signal lines corresponding to the integrated circuit chip IC are data lines or scan lines. In FIG. 1, the signal lines D(1)~D(8) are exemplified by the data lines and are electrically connected to their corresponding integrated circuit chips IC, respectively. The integrated circuit chips IC(1) and IC(2) drive the pixel circuit (the pixel circuit is not shown in FIG. 1) by their corresponding signal line D, and further include at least one first amplifier OP, respectively. For example, the first integrated circuit chip IC (1) has a first amplifier OP1, and the second integrated circuit chip IC (2) also has a first amplifier OP2.

The internal repair lines R1 and R2 are formed on the display panel 120, that is, the lower glass substrate, and crossed over the signal lines D(1)~D(8). At least part of the repair line L1, for example a first portion of repair line L1, is formed on the display panel 120 and crossed over the signal lines D(1)~D(8), and at least part of the repair line L2, for example a first portion of repair line L2, is also formed on the display panel 120 and crossed over the signal lines D(1)~D (8), so that the repair lines L1 and L2 can be selectively electrically connected to the signal line D(1)~D(8) by laser welding. The liquid crystal display 100 can further includes a printed circuit board (not shown), and a second portion of the repair line L1 and a second portion of the repair line L2 can be formed inside the printed circuit board which is electrically connected to the integrated circuit chips IC(1) and IC(2). The first connection circuit 102(1) is formed on the display panel 120, and includes a first portion T(1) and a second portion T(2). The first portion T(1) is electrically connected to the output end of the first amplifier OP1 and crossed over the repair lines L1 and L2. The second portion T(2) is electrically connected to the input end of the same first amplifier OP1 and crossed over the internal repair lines R1 and R2. The second connection circuit 102(2) is also formed on the display panel 120, and includes two portions as well, namely, a first portion T(3) and a second portion T(4). The first portion T(3) is electrically connected to the output end of another first amplifier OP2, and crossed over the repair lines L1 and L2. The second portion T(4) is electrically connected to the input end of the first amplifier OP2, and crossed over the internal repair lines R1 and R2. The first portion T(1) of the first connection circuit 102(1) and the first portion T(3) of the second connection circuit 102(2) are selectively electrically connected to the repair lines L1 and L2, respectively. The second portion T(2) of the first connection circuit 102(1) and the second portion T(4) of the second connection circuit 102(2) are selectively electrically connected to the repair lines L1 and L2. Or, the second portions T(2) and T(4) are electrically connected to the internal repair lines R1 and R2 respectively while being formed on the display panel 120, so that the cost of laser welding which would otherwise be performed afterwards can be saved.

Figure 2:
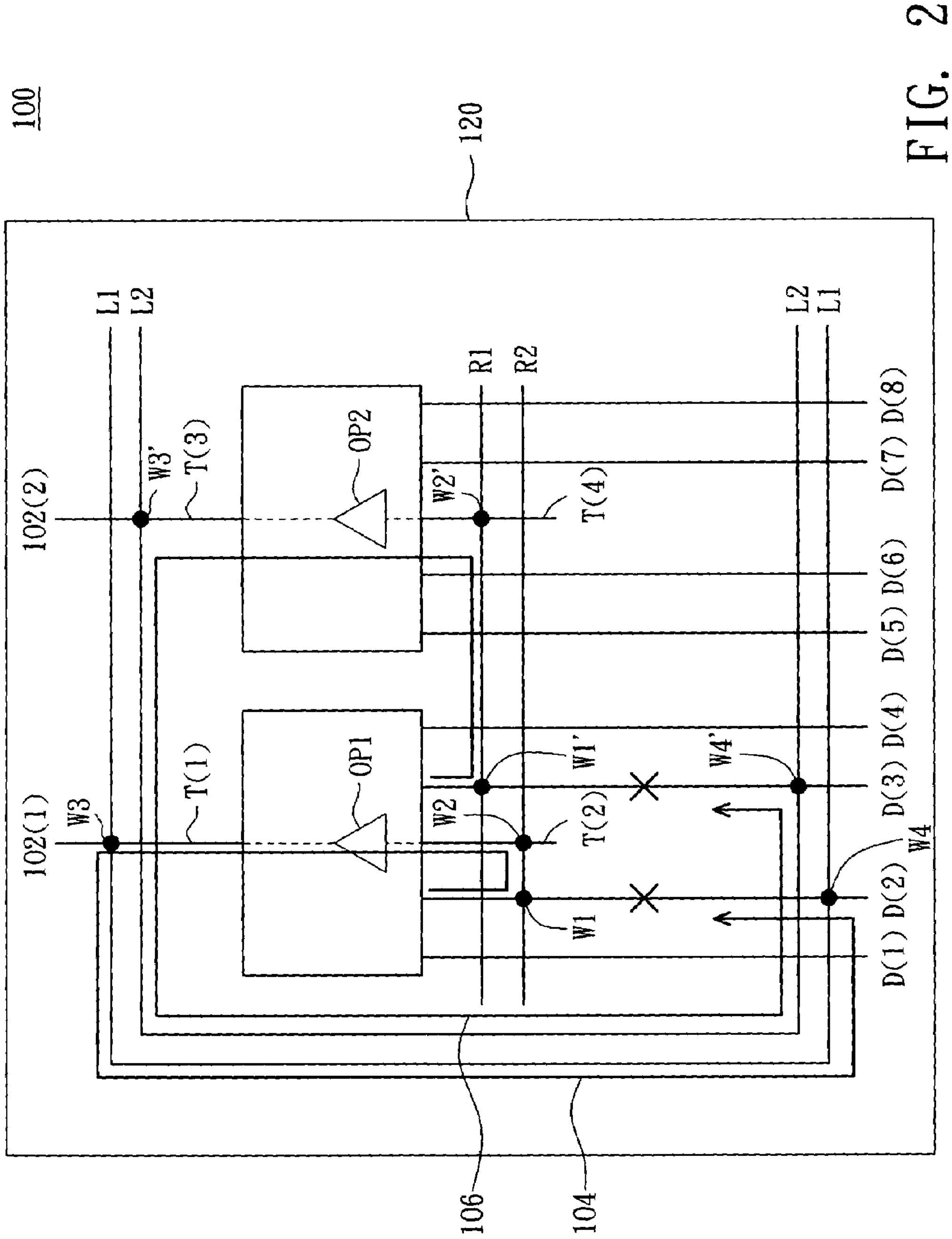
FIG. 2 is a structural diagram illustrating the liquid crystal display which is repaired.

Referring to FIG. 2, a structural diagram illustrating the liquid crystal display that is repaired is shown. Take the second signal line D(2) for example. When an open circuit occurs in the signal line D(2), one end of the signal line D(2) is electrically connected to the internal repair line R2 by laser welding to form a welding point W1, the second portion T(2) of the first connection circuit 102(1) is connected to the internal repair line R2 by laser welding to form a welding point W2, and the first portion T(1) of the connection circuit 102(1) is connected to the repair line L1 by laser welding to form a welding point W3, and another end of the signal line D(2) is connected to the repair line L1 by laser welding to form a welding point W4. Thus, the welding points W1~W4 are formed to create a path 104, and the signals transmitted through the signal line D(2), such as the pixel voltage, can use the first amplifier OP1 of the path 104 to be amplified so as to solve the problem of signal attenuation. Similarly, when an open circuit occurs in the third signal line D(3), the welding points W1'~W4' are formed to create another path 106, and the signals transmitted through one end of the third signal line D(3) can use the first amplifier OP2 of the path 106 to solve the problem of signal attenuation and transmit the signals to another end of the third signal line D(3).

Figure 3:
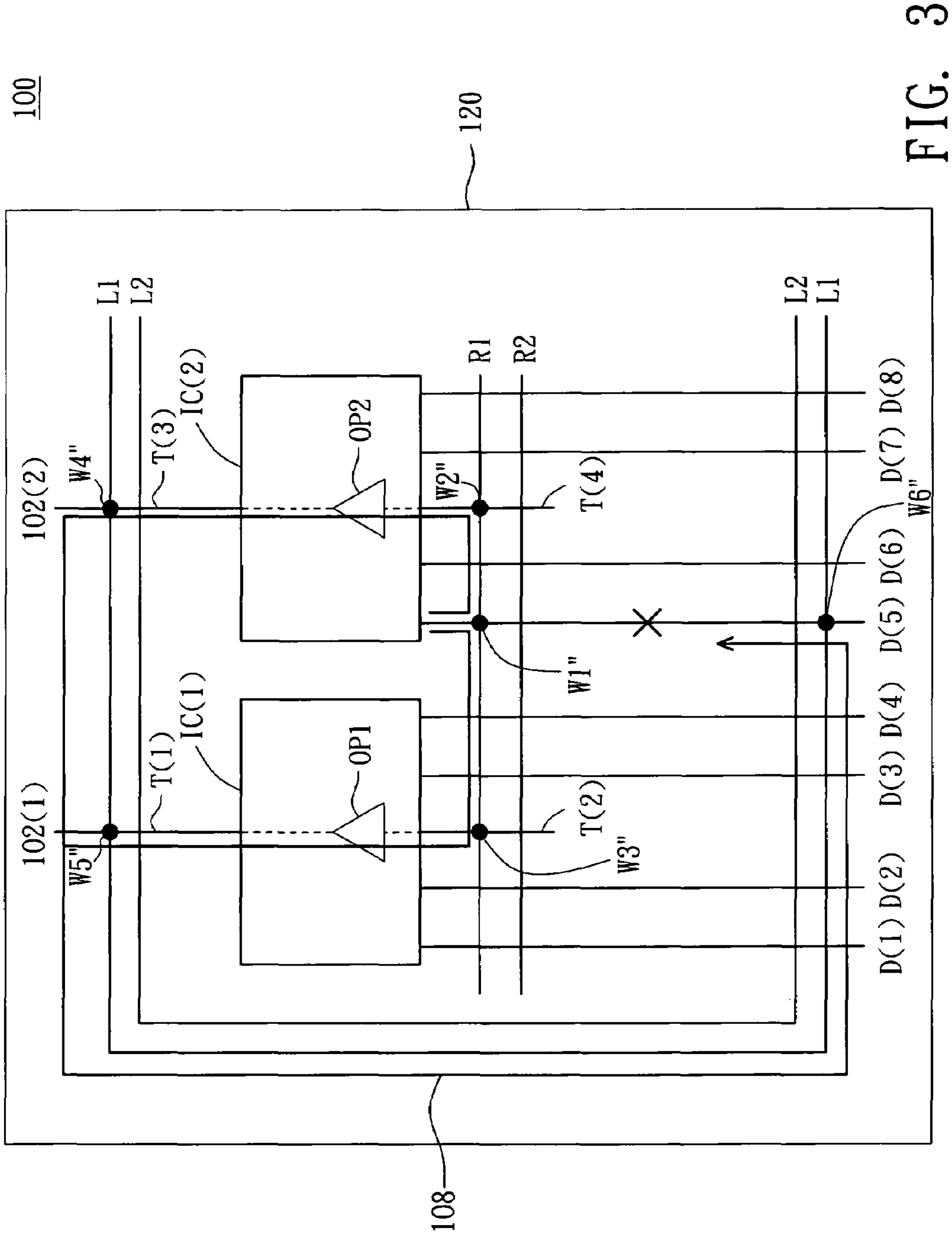
FIG. 3 is another structural diagram illustrating the liquid crystal display which is repaired.

Referring to FIG. 3, another structural diagram illustrating the liquid crystal display that is repaired is shown. When one amplifier OP alone is unable to solve the problem of signal attenuation, several amplifiers can be connected in parallel to resolve the problem. Referring to FIG. 3, when an open circuit occurs in the fifth signal line D(5), the path of the repair line L1 or L2 being too long, so that the magnitude of signal attenuation is too large. Under such circumstances, the two second portions T(2) and T(4) are welded to the same internal repair line R1, the two first portions T(1) and T(3) are welded to the same repair line L1, and the repair line L1 is welded to the signal line D(5). The above way of connection forms six welding points W1"~W6". After the six welding points W1"~W6" are formed, a path 108 is created. Therefore, the two amplifiers OP1 and OP2 are connected in parallel to compensate the signal attenuation.

To summarize the above disclosure, the design of disposing the amplifier OP inside the integrated circuit chip IC solves the problem of signal attenuation; meanwhile, the connection circuit 102 further provides more flexibility to the connection between the amplifier OP and the signal line having an open circuit. Besides, as long as the size of the integrated circuit chip IC does not increase, the manufacturing cost of the integrated circuit chip IC will not increase either. Therefore, the invention effectively controls the manufacturing cost of the liquid crystal display 100.

Figure 4A:
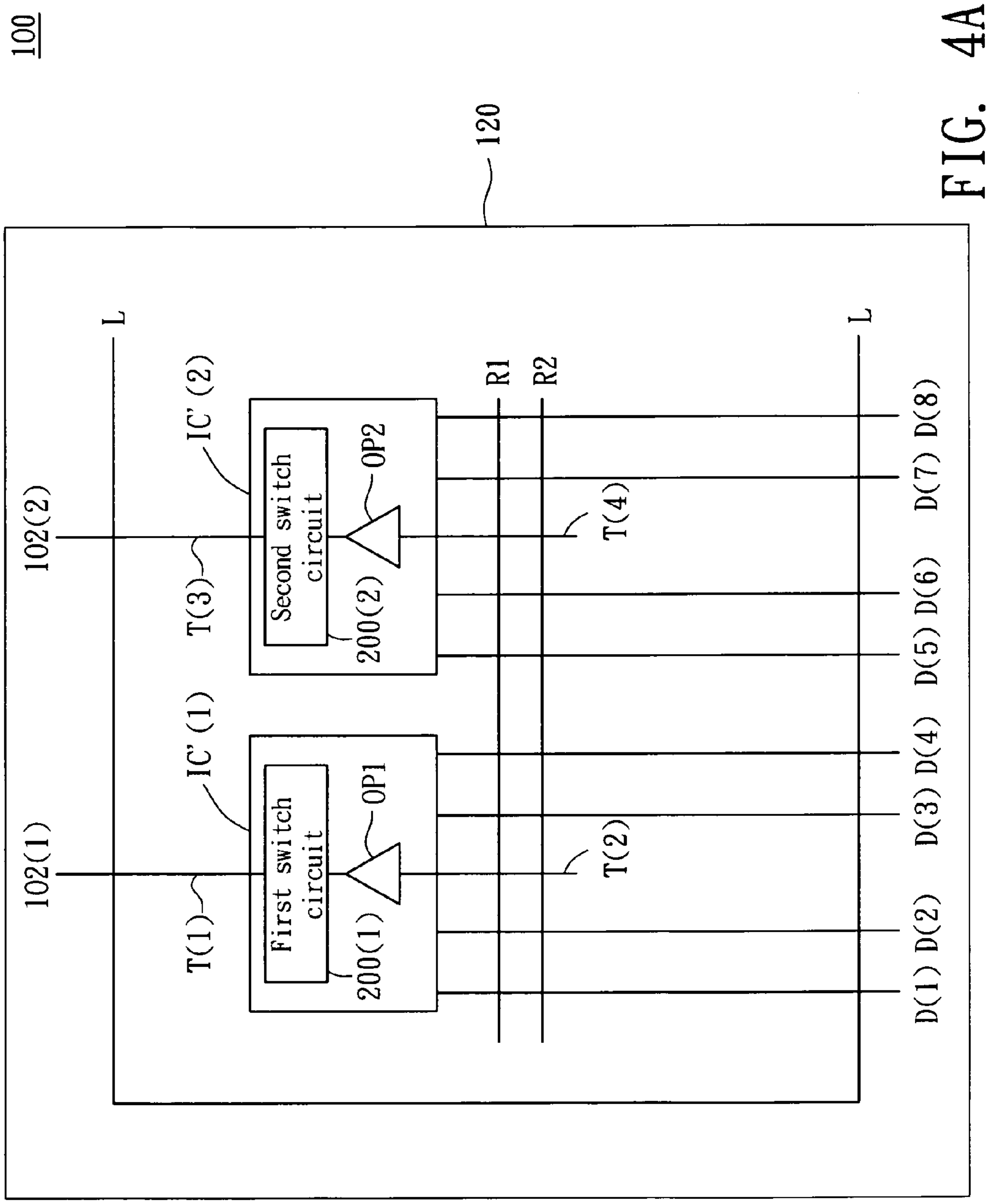
FIG. 4A is a structural diagram of the liquid crystal display according to another embodiment of the present invention.
Figure 4B:
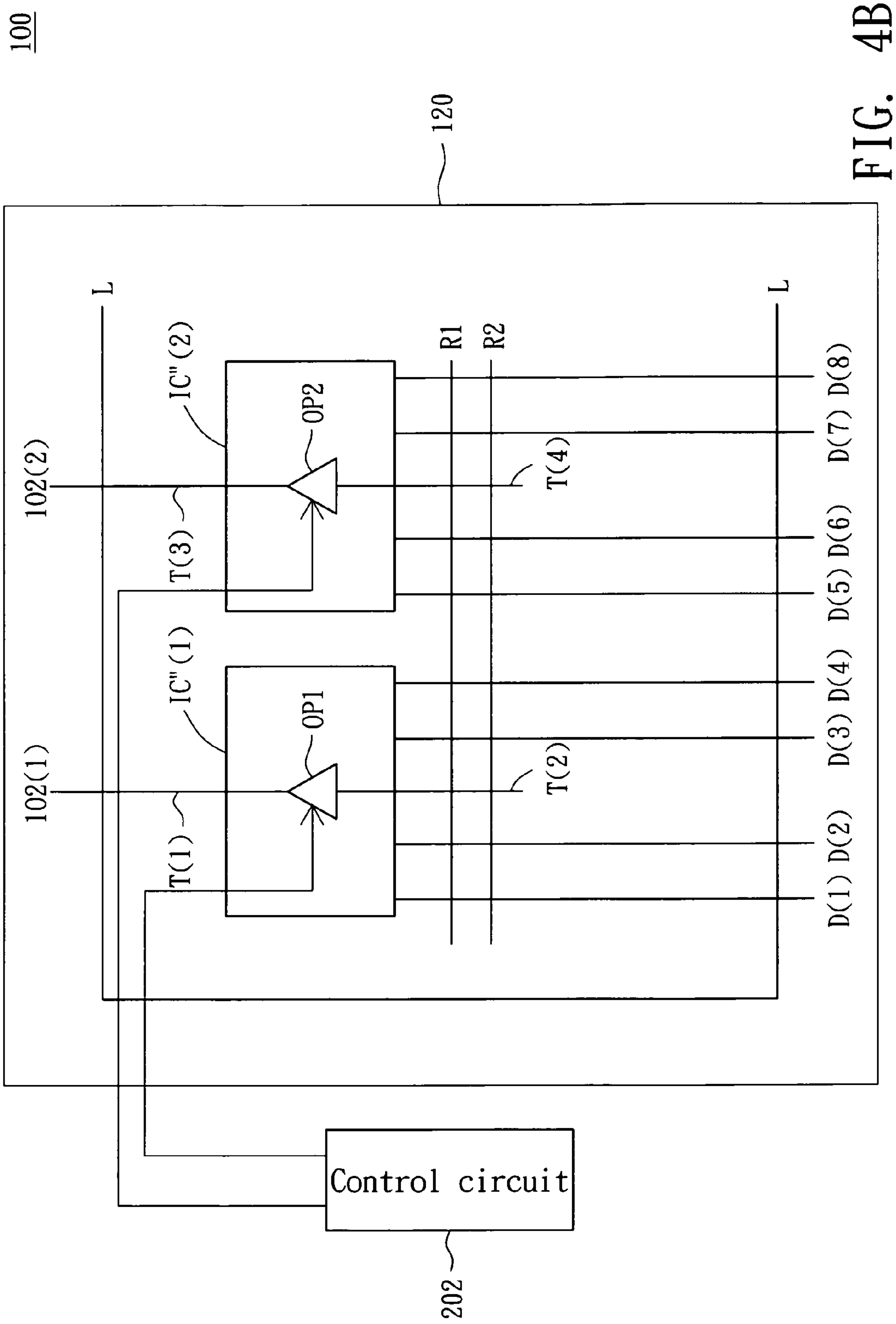
FIG. 4B is a structural diagram of the liquid crystal display according to a third embodiment of the present invention.

Referring to FIG. 4A, a structural diagram of the liquid crystal display according to another embodiment is shown. In order to reduce the cost of laser welding, the first portion T of the connection circuit is electrically connected to the corresponding repair line L first. However, such practice would result in interference between amplifiers. The embodiment disposes a switch circuit between the amplifier OP and the connection circuit to form an open circuit between the not-in-use amplifier and the repair line L, so that the interference between the amplifiers is resolved. As shown in FIG. 4A, the liquid crystal display 100 further includes other integrated circuit chips IC'(1) and IC'(2). Apart from including an amplifier OP, the integrated circuit chip IC'(1) and IC'(2) further include a switch circuit 200, respectively. That is, the output end of the first amplifier OP1 is coupled to the first portion T(1) of the first connection circuit 102(1) via a first switch circuit 200(1), while the output end of another first amplifier OP2 is coupled to the first portion T(3) of the second connection circuit 102(2) via a second switch circuit 200(2). The first portions T(1) and T(3) are electrically connected to the repair line L first while being formed on the display panel 120. The first switch circuit 200(1) is turned on to connect the first amplifier OP1 to the repair line L when the first amplifier OP1 is used to repair a certain signal line D. Similarly, the second switch circuit 200(2) is turned on when another first amplifier OP2 is used to repair a certain signal line D. By doing so, the interference between the amplifiers OP1 and OP2 can be resolved by the two switch circuits 200(1) and 200(2). Or, referring to FIG. 4B, a structural diagram of the liquid crystal display according to a third embodiment is shown. Using a control circuit to control the power of the first amplifier OP1 and the power of the second amplifier OP2 can resolve the interference between the amplifiers, respectively. As shown in FIG. 4B, the liquid crystal display 100 further includes a control circuit 202. The control circuit 202 is used for selectively providing power to the first amplifier OP1 or the second amplifier OP2 which is in operation. In other words, when the first amplifier OP1 is used to repair a certain signal line D, the control circuit 202 provides power to the first amplifier OP1 for the corresponding signals to be amplified and transmitted to the repair line L by the first amplifier OP1. As for the first amplifier OP2 that are not used, the control circuit 202 does not provide power to resolve the interference between the amplifiers. Besides, compared with the other amplifiers which are always at a power receiving state, the not-in-use amplifier OP does not receive power, thereby reducing the power consumption of the liquid crystal display 100.

Figure 5A:
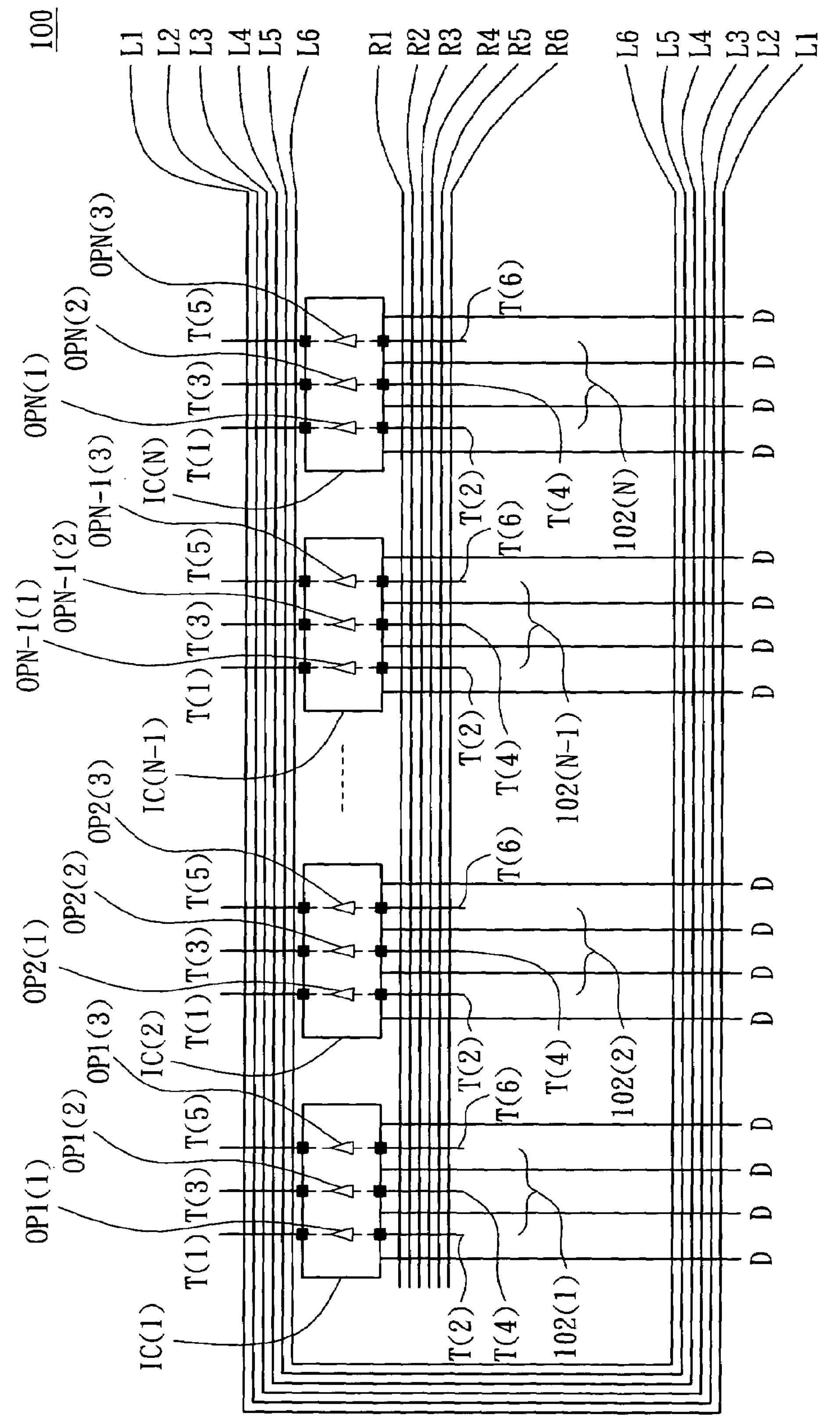
FIG. 5A is a structural diagram of the liquid crystal display according to a fourth embodiment of the present invention.

The above disclosure is exemplified by two integrated circuit chips IC (1) and IC (2), two internal repair lines R1 and R2, two repair line L1 and L2, eight signal lines D(1)~D(8) and two connection circuits 102(1) and 102(2). However, the invention does not impose any restriction with regard to the number of the amplifiers OP disposed on the integrated circuit chip IC, the number of the internal repair lines R, the number of the repair lines L, nor the number of the signal lines D electrically connected to an integrated circuit chip IC, or the disposition way of the integrated circuit chips IC. Referring to FIG. 5A, a structural diagram of the liquid crystal display according to a fourth embodiment is shown. The liquid crystal display 100 includes several integrated circuit chips IC(1)~IC (N), several connection circuits 102(1)~102(N), six repair lines L1~L6 and six internal repair lines R1~R6. Each of the several integrated circuit chips IC(1)~IC(N) is equipped with three first amplifiers OP1(1)~OP1(3) and is electrically connected to four signal lines D, respectively. In total, there are N×4 data lines D (denoted by the reference label D in FIG. 5A, FIG. 5B and FIG. 5C). The connection circuits 102 corresponding to the first amplifier OP1 further include several first portions and several second portions, namely, the first portions T(1), T(3) and T(5) and the second portion T(2), T(4) and T(6). The first portions and the second portions of the connection circuits 102(1)~102(N) are denoted by reference labels T(1), T(3) and T(5) and T(2), T(4) and T(6) in FIG. 5A, FIG. 5B and FIG. 5C. Like the above disclosure, the first portions T(1), T(3) and T(5) are respectively and electrically connected to the output ends of the first amplifier OP1(1) ~OP1(3) and crossed over the repair lines L1~L6. Like the above disclosure, the second portion T(2), T(4) and T(6) are also respectively and electrically connected to the input ends of the first amplifiers OP1(1)~OP1(3) and crossed over the internal repair lines R1~R6.

Figure 5B:
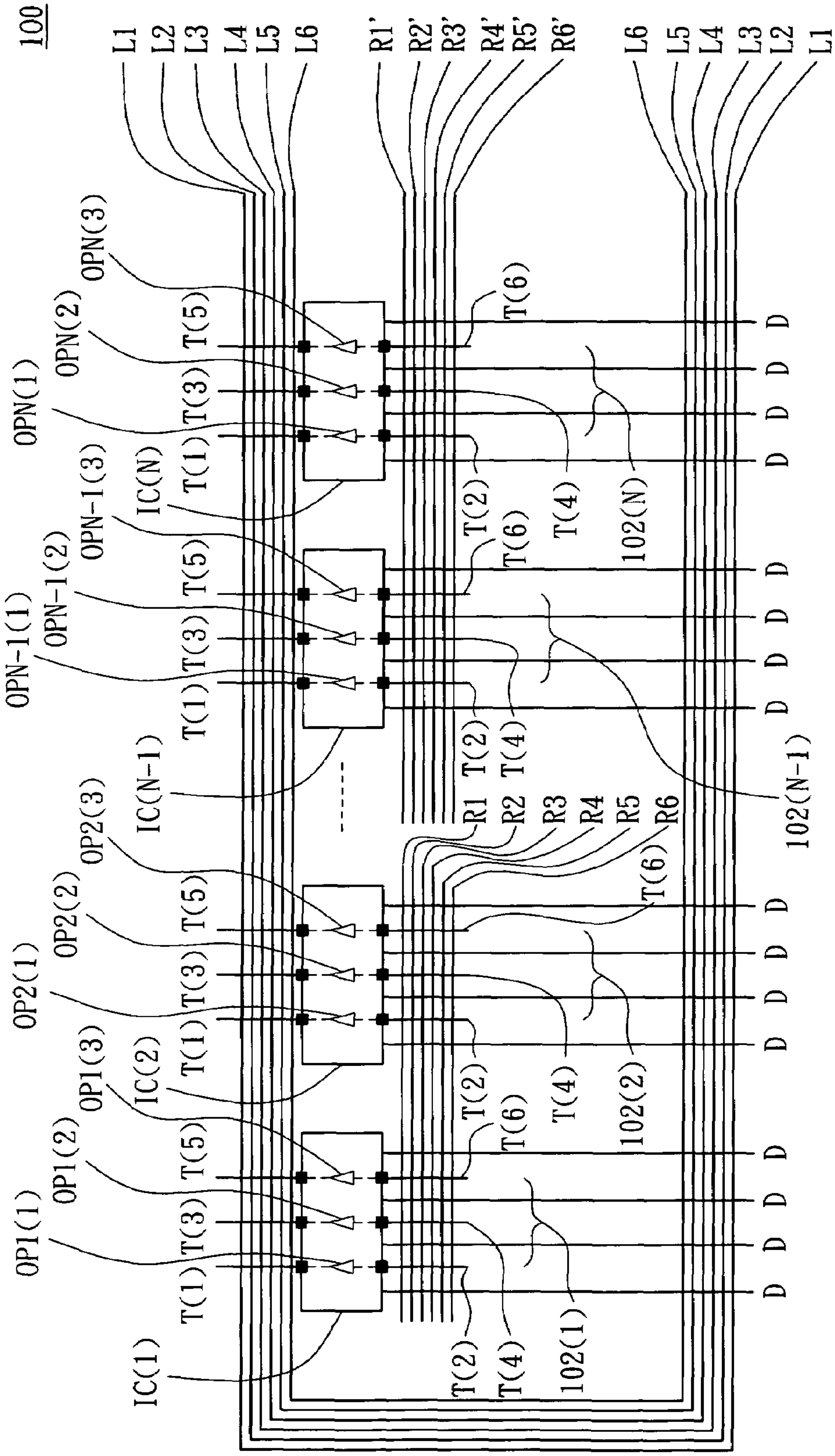
FIG. 5B is a structural diagram of the liquid crystal display according to a fifth embodiment of the present invention.
Figure 5C:
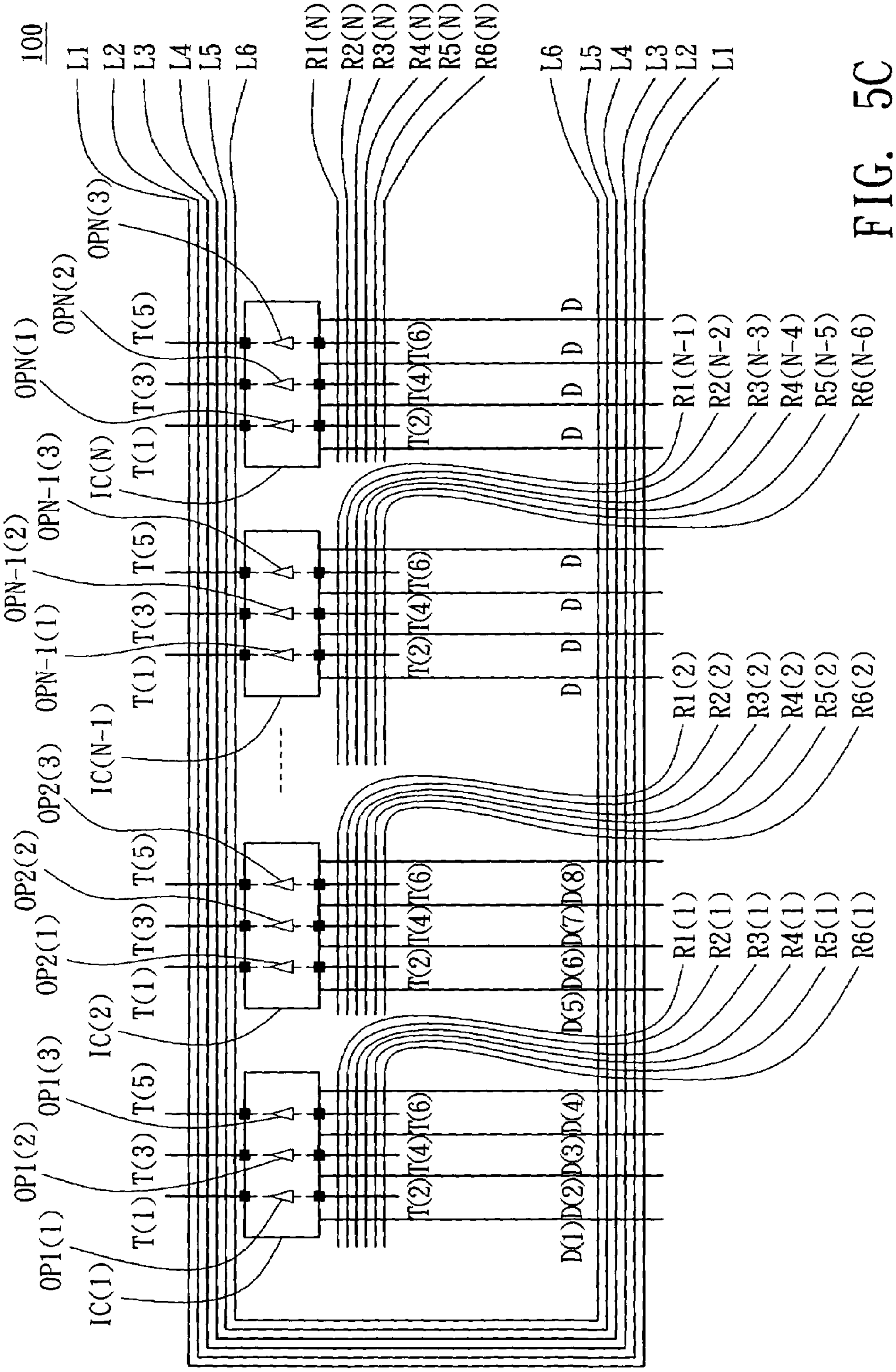
FIG. 5C is a structural diagram of the liquid crystal display according to a sixth embodiment of the present invention.

Or, referring to FIG. 5B, a structural diagram of the liquid crystal display according to a fifth embodiment is shown. The internal repair lines R can be divided into two groups, namely, the internal repair lines R1~R6 used for being crossed over a half of the signal lines D, and the other internal repair lines R1'~R6' used for being crossed over another half of the signal lines D. Or, the internal repair lines R can be divided into N groups in response to the number of the integrated circuit chips IC. Referring to FIG. 5C, a structural diagram of the liquid crystal display according to a sixth embodiment is shown. That is, the first internal repair line set includes internal repair lines R1(1)~R6(1) used for being crossed over the four signal line D(1)~D(4) which are electrically connected to the first integrated circuit chip IC(1). The second internal repair line set includes internal repair lines R1(2)~R6(2) used for being crossed over the second integrated circuit chip IC(2) which is electrically connected to the four signal lines D(5) ~D(8). The remaining repair line sets including R1(3)~R6(3) to R1(N)~R1(N) respectively are processed in the same way and are not repeated here. To summarize, the number of the internal repair lines R and the number of sets thereof are not restricted, and can be determined by the user according to the consideration of manufacturing cost or compensation.

Figure 6:
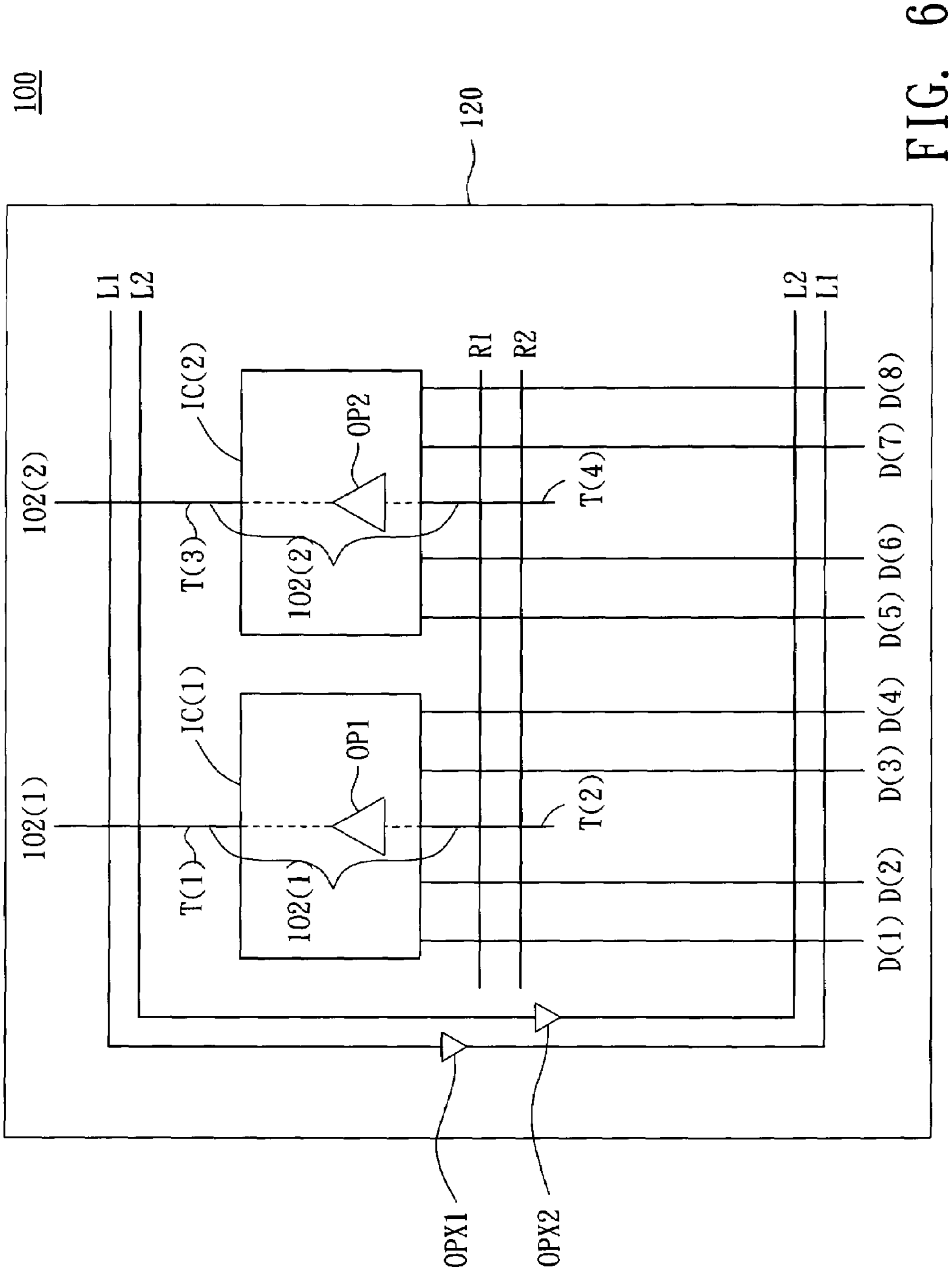
FIG. 6 is a structural diagram of the liquid crystal display according to a seventh embodiment of the present invention.

Of the repair lines L mentioned above, another amplifier (the second amplifier OPX) can be disposed on the routing path of the repair line L to further solve the problem of signal attenuation. Referring to FIG. 6, a structural diagram of the liquid crystal display according to a seventh embodiment is shown. The repair line L1 is connected to the second amplifier OPX1 in serial, and the repair line L2 is connected to the second amplifier OPX2 in serial. That is, part of the repair line L1, the second amplifier OPX1, and the other part of the repair line L1 are serially connected, and part of the repair line L2, the second amplifier OPX2, and the other part of the repair line L2 are serially connected. Therefore, the problem of signal attenuation is further solved.

According to the liquid crystal display and the repair line structure thereof disclosed in above embodiments of the invention, an amplifier is disposed inside an integrated circuit chip, and an appropriate connection circuit is designed for enabling the amplifier to be electrically connected to a repair line. Consequently, the problem of signal attenuation occurring in the repair line is solved, the repair flexibility is increased, and the manufacturing cost is effectively controlled.

While the present invention has been described by way of example and in terms of a preferred embodiment, it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display, comprising:

a display panel having a plurality of signal lines;

at least one internal repair line formed on the display panel and crossed over the plurality of signal lines;

at least one repair line, at least part of the repair line being formed on the display panel and crossed over the plurality of signal lines;

at least one integrated circuit chip electrically connected to the signal lines, the integrated circuit chip comprising:

at least one first amplifier having an input end selectively electrically connected to the at least one internal repair line, and an output end selectively electrically connected to the at least one repair line; and a connection circuit formed on the display panel, the connection circuit comprising:

at least one first portion electrically connected to the output end of the at least one first amplifier and crossed over the at least one repair line; and at least one second portion electrically connected to the input end of the at least one amplifier and crossed over the at least one internal repair line.

2. The liquid crystal display of claim 1, wherein the at least one internal repair line comprises a first internal repair line and a second internal repair line, the at least one repair line comprises a first repair line and a second repair line, the at least one first portion of the connection circuit is crossed over the first repair line and the second repair line, and the at least one second portion of the connection circuit is crossed over the first internal repair line and the second internal repair line.

3. The liquid crystal display of claim 1, further comprising at least one printed circuit board electrically connected to the at least one integrated circuit chip, wherein the repair line comprises:

at least one first portion disposed inside the printed circuit board; and at least one second portion formed on the display panel and crossed over the signal lines.

4. The liquid crystal display of claim 1, wherein the integrated circuit chip comprises a data driver, and the signal lines are data lines.

5. The liquid crystal display of claim 1, wherein the integrated circuit chip comprises a scan driver, and the signal lines are scan lines.

6. The liquid crystal display of claim 1, wherein the integrated circuit chip further comprises:

at least one switch circuit disposed between the output end of the at least one amplifier and the at least one repair line.

7. The liquid crystal display of claim 1, further comprising:

a control circuit for selectively providing power to the at least one first amplifier in operation.

8. The liquid crystal display of claim 1, further comprising:

at least one second amplifier connected to the repair line in serial.

9. The liquid crystal display of claim 8, wherein the at least one second amplifier is connected to the at least one first amplifier in parallel.

10. A liquid crystal display, comprising:

a display panel having a plurality of signal lines;

a plurality of internal repair line sets, each internal repair line set being formed on the display panel and crossed over part of the signal lines;

at least one repair line, at least part of the repair line being formed on the display panel and crossed over the signal lines;

a plurality of integrated circuit chips electrically connected to the signal lines, each integrated circuit chip comprising:

at least one first amplifier having an input end selectively electrically connected to each internal repair line set, and an output end selectively electrically connected to the repair line; and a plurality of connection circuits formed on the display panel, each connection circuit comprising:

at least one first portion electrically connected to the output end of the first amplifier and crossed over the repair line; and at least one second portion electrically connected to the input end of the first amplifier and crossed over each internal repair line set.

11. The liquid crystal display of claim 10, wherein each internal repair line set comprises at least one internal repair line.

12. The liquid crystal display of claim 10, wherein each internal repair line set comprises a first internal repair line and a second internal repair line, the at least one repair line comprises a first repair line and a second repair line, the at least one first portion of each connection circuit is crossed over the first repair line and the second repair line, and the at least one second portion of each connection circuit is crossed over the first internal repair line and the second internal repair line of one of the internal repair line sets.

13. The liquid crystal display of claim 10, further comprising at least one printed circuit board electrically connected to the plurality of integrated circuit chips, wherein the repair line comprises:

at least one first portion disposed inside the printed circuit board; and at least one second portion formed on the display panel and crossed over the signal lines.

14. The liquid crystal display of claim 10, wherein the integrated circuit chips are data drivers, and the signal lines are data lines.

15. The liquid crystal display of claim 10, wherein the integrated circuit chips are scan drivers, and the signal lines are scan lines.

16. The liquid crystal display of claim 10, wherein each integrated circuit chip comprises at least one switch circuit disposed between the output end of the corresponding first amplifier and the corresponding repair line.

17. The liquid crystal display of claim 10, further comprising:

a control circuit for selectively respectively providing power to the corresponding first amplifier in operation.

18. The liquid crystal display of claim 10, further comprising:

at least one second amplifier connected to the repair line in serial.

19. The liquid crystal display of claim 18, wherein the at least one second amplifier is connected to the at least one first amplifier in parallel.

* * * * *

UNITED STATES PATENT AND TRADEMARK OFFICE

CERTIFICATE OF CORRECTION

PATENT NO. : 7,609,246 B2
APPLICATION NO. : 11/445139
DATED : October 27, 2009
INVENTOR(S) : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Twelfth Day of October, 2010

David J. Kappos
*Director of the United States Patent and Trademark Office*